US011880315B2

(12) United States Patent
Frederick et al.

(10) Patent No.: US 11,880,315 B2
(45) Date of Patent: Jan. 23, 2024

(54) OPERATION OF AN OUTPUT COMPONENT TO PRODUCE A REPRESENTATION OF AN INSTRUCTION SET

(71) Applicant: HEWLETT-PACKARD DEVELOPMENT COMPANY, L.P., Spring, TX (US)

(72) Inventors: John Frederick, Spring, TX (US); Timothy Paul Guynes, Spring, TX (US); Anthony Kaplanis, Spring, TX (US); Syed S. Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/914,472

(22) PCT Filed: Apr. 15, 2020

(86) PCT No.: PCT/US2020/028181
§ 371 (c)(1),
(2) Date: Sep. 26, 2022

(87) PCT Pub. No.: WO2021/211103
PCT Pub. Date: Oct. 21, 2021

(65) Prior Publication Data
US 2023/0118384 A1    Apr. 20, 2023

(51) Int. Cl.
*G06F 13/10* (2006.01)
*G06F 1/3296* (2019.01)

(52) U.S. Cl.
CPC .......... *G06F 13/102* (2013.01); *G06F 1/3296* (2013.01)

(58) Field of Classification Search
None
See application file for complete search history.

(56) References Cited

U.S. PATENT DOCUMENTS

| 8,375,378 B2 | 2/2013 | Wang et al. |
| 9,007,526 B2 | 4/2015 | Chung et al. |
| (Continued) | | |

FOREIGN PATENT DOCUMENTS

| CN | 101414454 B | 11/2010 |
| CN | 104657161 A | 5/2015 |
| (Continued) | | |

OTHER PUBLICATIONS

Anonymous: "Instruction set—Simple 1—15 English Wikipedia, the free encyclopedia", Oct. 14, 2023 (Oct. 14, 2023), XP093091719, Retrieved from the Internet: URL:https://simple.wikipedia.org/wiki/Instruction set [retrieved on Oct. 14, 2023] * p. 1.

*Primary Examiner* — Michael Sun
(74) *Attorney, Agent, or Firm* — Quarles & Brady LLP

(57) ABSTRACT

An example peripheral device includes circuitry to identify a target device that matches the device type identifier of the peripheral device. The example circuitry of the peripheral device is to cause selection of an input component device, transmission of a request to place the input component of the target device into an instruction set receiver mode, and operation of an output component of the peripheral device to produce audio output or video output that represents the instruction set in response to a determination that an instruction set version identifier of the target device mismatches the instruction set version identifier of the peripheral device.

15 Claims, 5 Drawing Sheets

(56) References Cited

U.S. PATENT DOCUMENTS

| | | | |
|---|---|---|---|
| 9,146,725 B2 * | 9/2015 | Nolterieke | G06F 8/65 |
| 9,804,831 B2 * | 10/2017 | Shimizu | G06F 8/654 |
| 2007/0071408 A1 | 3/2007 | Ando et al. | |
| 2007/0250649 A1 * | 10/2007 | Hickey | G06F 13/385 |
| | | | 710/62 |
| 2013/0326495 A1 | 12/2013 | Reunamaki et al. | |
| 2017/0364346 A1 * | 12/2017 | Peng | G06F 13/4068 |
| 2019/0286817 A1 | 9/2019 | Butler et al. | |
| 2019/0297383 A1 * | 9/2019 | Mendenhall | H04N 21/43635 |

FOREIGN PATENT DOCUMENTS

| | | |
|---|---|---|
| CN | 108400882 A | 8/2018 |
| CN | 104951344 B | 2/2019 |
| WO | 2011/052791 A1 | 5/2011 |
| WO | 2013/151397 A1 | 10/2013 |
| WO | 2015/074435 A1 | 5/2015 |

\* cited by examiner

OPERATION OF AN OUTPUT COMPONENT TO PRODUCE A REPRESENTATION OF AN INSTRUCTION SET

BACKGROUND

Peripheral devices may be attached to host devices to enhance a computing experience and provide additional input/output (I/O) functionality to the host device. For example, a human interface device (HID), such as a mouse or keyboard, may be attached to the host device to provide input from a user and a display device may be attached to the host device to provide output to the user.

DETAILED DESCRIPTION

Figure 1:
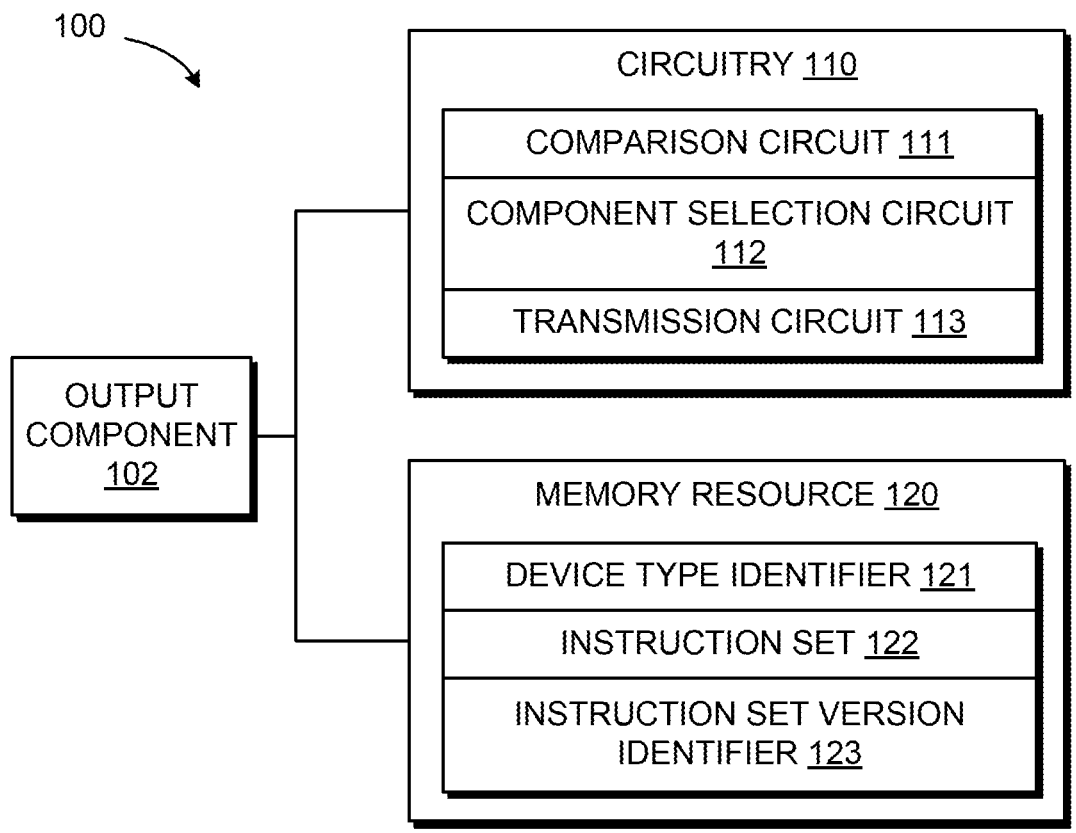
FIGS. 1-3 are block diagrams depicting example peripheral devices.

In the following description and figures, some example implementations of peripheral devices, systems, and/or methods of data transfer are described. In examples described herein, a peripheral device is any appropriate electronic, input/output (I/O) device coupleable to a host device. As used herein, a host device is a general purpose computer of any form factor (such as, desktop computer, laptop computer, tablet computer, mobile phone, etc.). A peripheral device may be any form of computer accessory or other human interface device (HID) capable of providing input or receiving output from the host device. In this manner, the peripheral devices are generally coupled to the host device via an I/O port or an I/O protocol (e.g., wireless communication protocol). Example peripheral devices include, but are not limited to, display devices, keyboards, computer mice, headsets, styluses, direct or indirect inking devices, printers, scanners, head-mountable displays (HMDs), microphones, cameras, external memory storage devices, universal serial bus (USB) drives, external graphics devices, speakers, game controllers, video conferencing equipment, power adapters, power packs, calculators, docking stations, cables, mouse pads, wireless chargers, lighting, smart furniture, smart home devices, and the like. As used herein, a peripheral device does not include a host device and is not a standalone networking device (such as modems, routers, switches, hubs, or repeaters). For example, a peripheral device may be connected to a host device to perform network communication, and a peripheral device may not have a host-to-host or server-client communication ability.

In examples described herein, a "display device" is a device to present content visually. A display device, for example, may produce a visual representation of an image by operating light-emissive circuitry, light-reflective circuitry, or a combination thereof, represented as a number of pixels based on processed image data. Example display devices may include a panel such as a liquid crystal display (LCD) panel, an organic light-emitting diode (OLED) panel, a micro light emitting diode (PLED), or other display technology. In some examples, a display device may also include circuitry to operate the panel, such as a monitor scaler, such that the panel produces visual output. A display device may include other audio or video components integrated in the device, such as speakers, a camera, and a microphone.

Peripheral devices, such as display devices, generally utilize updates to instructions sets, such as firmware updates to operate the monitor scaler in an improved manner (e.g., with less operational errors), for example. Peripheral devices may be updated via a host device to which the peripheral device is connected. Thus, a firmware upgrade for a peripheral device may utilize an active connection with the host device to be able to perform the firmware upgrade.

Various examples described below relate to operating the peripheral device to perform an instruction set transfer via a neighbor peripheral device of the same type. A hostless firmware upgrade is possible via identification of a neighbor peripheral device of the same type and generation of a request to transfer an updated instruction set by using components of the peripheral device that produce audio output or video output (or both). For example, the transfer of the instruction set may be secure and accurate by limiting transfers between known model type family members and communicating via audio/video (A/V) components rather than traditional networking communication channels, such as wired electrical data transfers (e.g., over an ETHERNET cable) or wireless electrical data transfers (e.g., over a WIFI protocol). The transfers of instruction sets discussed herein may be performed automatically, such as to perform the transfer between peripheral devices when the peripheral devices are below a threshold of activity (e.g., based on the time of day and/or initiated when the device is in a power sleep state). In this manner, firmware upgrades may be propagated among devices without the need of an active host device being coupled to each peripheral device to be maintained.

Figure 2:
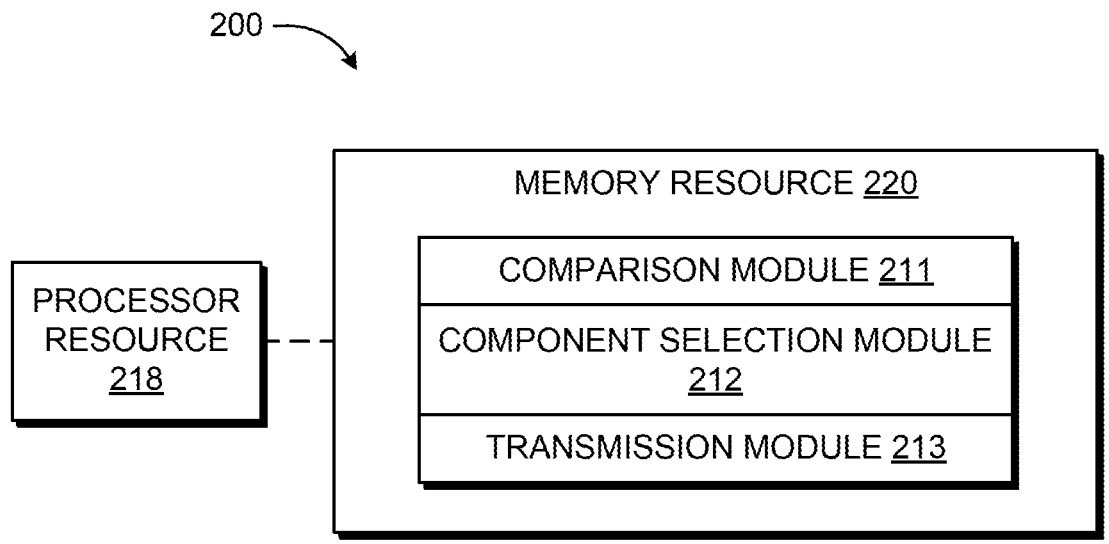
Figure 3:
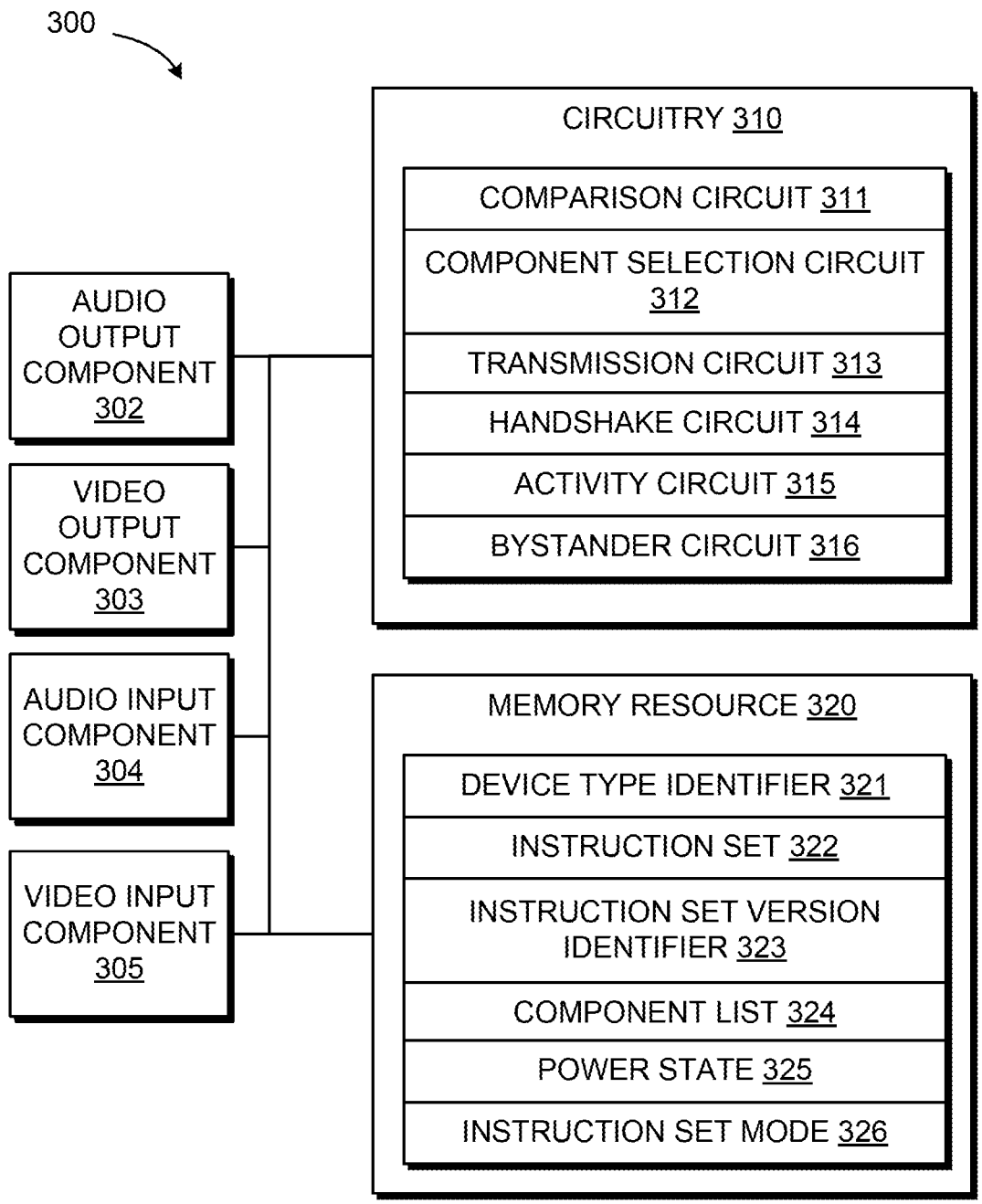

FIGS. 1-3 are block diagrams depicting example peripheral devices 100, 200, and 300. Referring to FIG. 1, the example peripheral device 100 generally includes an output component 102, circuitry 110, and a memory resource 120. The output component 102 represents any appropriate hardware component to produce audio output or video output. Example audio output devices may be speakers, haptic devices, headsets, and the like. For example, the hardware component may be a transducer or loudspeaker that generates sound signals through movement based on electrical changes with respect to a magnet. Example video output devices may be a light emitting diode (LED), a backlight, a panel of a display, a reflector, and the like. For example, the hardware component may be an illuminateable keycap of a keyboard that is able to change color or flash at a controllable frequency.

The memory resource 120 may store data useable by the peripheral device 100. For example, the memory resource 120 may store data representing a device type identifier 121, an instruction set 122, and an instruction set version identifier 123 that corresponds to the instruction set 122. The device type identifier 121 and the instruction set version identifier 123 may be any appropriate representation, such as a number, a letter, a symbol, a category, a classification, or other type of identification capable of representing a particular group of devices or a particular version of an instruction set, respectively. The device type identifier 121 may represent a device model or classification, a component model such as a panel model, an original design manufacturer (ODM), a date of manufacture, extended display identification data, and the like, or a combination thereof. A device type identifier does not include an identifier specific to an individual peripheral device, such as a serial number, unless the unique identifier includes a portion corresponding to a group of devices (such as where the first portion of the serial number represents the device model number and the second portion of the serial number is unique to the individual device so that the first portion of the serial number could be used by the circuitry 110 to identify a group of devices). An example of a device type identifier may be a string of characters that represents a subset of ODMs and panels manufactured during a particular range of dates.

The instruction set 122 may be any appropriate data representing executable instructions, such as binary code, hexadecimal code, machine level code, operating system code, application level code, etc. Indeed, the instructions residing on a memory resource may comprise any set of instructions to be executed directly (such as machine code) or indirectly (such as a script) by a processor resource. Example instruction sets 122 may include a version of firmware (e.g., updated firmware), a software application capable of being executed by the resources of the peripheral device 100, or a data resource used by firmware on the peripheral device or an application executable by the peripheral device (such as an updated look-up table or an updated color profile).

As used herein, a memory resource is a medium to store data utilized and/or produced by the peripheral device. The medium is any non-transitory medium or combination of non-transitory media able to electronically store instructions or data sets used by the peripheral device 100. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive. A memory resource may be integrated in the same device as a processor resource or it may be separate but accessible to that device and the processor resource. A memory resource may be distributed across devices.

The example circuitry 110 may be any appropriate number of circuits where a circuit may be composed of individual electronic components, such as resistors, transistors, capacitors, inductors and diodes, connected by conductive wires or traces. A circuit may comprise a processor resource and a memory resource having executable instructions stored thereon. The example circuitry 110 includes a comparison circuit 111, a component selection circuit 112, and a transmission circuit 113. In other implementations, the functionality of multiple circuits may be implemented as a single circuit or divided in a variety of circuits different from the example shown in FIG. 1.

The comparison circuit 111 represents circuitry to perform data comparisons. Such data comparisons performable by the comparison circuit 111 include comparisons of the device type identifiers and instruction set version identifiers across devices. For example, the comparison circuit 111 may be a combination of a processor resource and executable instructions that compare a first device type identifier of a first device to a second device type identifier of a second device and, in response to a determination that the first device type identifier matches the second device type identifier, compare a first instruction set version identifier of the first device to a second instruction set version identifier of the second device. The device type and version comparisons may include additional information when determining a match or mismatch. For example, the comparison circuit 111 may be a combination of electrical components to identify a target device that matches the device type identifier 121 of the peripheral device 100 within a proximity threshold associated with the output component 102.

The component selection circuit 112 represents circuitry to perform selection of audio or video components to be used to transfer the instruction set 122. For example, the component selection circuit 112 may include a combination of a processor resource and executable instructions to cause retrieval of a list of components associated with device type and select one of the output components that can function with an input component of the receiver peripheral to transfer data. The component selection circuit 112 may act based on a comparison made by the comparison circuit 111. For example, the component selection circuit 112 may cause selection of an input component of the target device corresponding to the device type identifier 121 and the output component 102 of the peripheral device 100 in response to a determination that an instruction set version identifier of a target device mismatches the instruction set version identifier 123 of the peripheral device 100. In an example where a peripheral device has multiple options for communicating audio or video output (e.g., multiple output components to choose from), a user preference may be used to determine which component to use to perform a transfer of the instruction set 122. For example, an option on an on-screen display menu may allow a user to select from transferring audio signals using a speaker or transferring video signals using a backlight of a panel to generate flashes of light.

The transmission circuit 113 represents circuitry to perform transmission of an instruction set via use of the output component 102 selected by the component selection circuit 112. For example, the transmission circuit 113 may include a combination of a processor resource and executable instructions that cause operation of an output component 102 of the peripheral device 100 to produce audio output or video output that represents the instruction set 122 in response to a determination that an instruction set version identifier of the target device mismatches the instruction set version identifier 123 of the peripheral device 100. The audio output or video output includes a representation of the instruction set 122 when at least part of the signal to generate the output is processed based on the data representing the instruction set (e.g., modified the signal to include frequency adjustments that correspond to the instructions being added to the signal) or at least part of the signal received by a peripheral device is able to be processed to generate data corresponding to the instruction set.

The transmission circuit 113 may include circuitry to prepare and/or cause the components to perform the data transfer. For example, the transmission circuit 113 may include a combination of a processor resource and executable instructions that cause transmission of a request to place the input component of the target device into an instruction set receiver mode and cause the output component to be placed in an instruction set producer mode, in response to a determination that an instruction set version identifier of the target device mismatches the instruction set version identifier 123 of the peripheral device 100.

As used herein, the instruction set receiver mode is a mode of operation of a component that allows for audio or video signals to be received within a characteristics range associated with a transfer of an instruction set between peripheral devices of the same device type, and the instruction set producer mode is a mode of operation of a component that allows for audio or video signals to be generated within a characteristics range associated with the transfer of an instruction set between peripheral devices of the same device type. As used herein, a characteristics range is an operational setting or a range of operational capability of a component to produce audio and/or video output. A characteristics range may be based on mechanical or electrical limitations of the component. A characteristics range may be based on whether audio and/or video output is being used to transfer the instruction set and may be based on the state of the peripheral device. For example, an audio frequency above 20,000 hertz may be used to transfer the instruction set over audio signals when the selected output speaker component is in use, but may include a lower frequency range if the device is in a power sleep state or the time of day is outside of defined work hours. For another example, the characteristics range for video output may be a rate of flashes or diversity of a color set to be used to encode a signal identifiable by a light sensor based on the quality of the light sensor (e.g., the degree of accuracy capable by the light sensor). In some examples, the peripheral device 100 may be limited from producing encoded signal within the characteristics range reserved for the instruction set receiver mode and the instruction set producer mode unless the peripheral device is in an operation state corresponding to that respective mode.

If the peripheral device 100 is a display device, the circuitry 110 may be implemented in the display scaler circuit, the output component selected by the component selection circuit 112 may be the panel of the display device, and the input component of the target device selected to receive the instruction set encoded in video produced by the panel of the peripheral device 100 may be an optical sensor of the target device. In that example, operation of the panel produces video output from the panel representing the instruction set 122 while the input component of the target device is in the instruction set receiver mode.

If the peripheral is a human interface device (HID), the output component selected by the component selection circuit 112 may be a speaker of the HID, and the input component of the target device to receive the instruction set encoded in audio produced by the speaker of the peripheral device 100 may be a microphone coupled to (or integrated within) the target device. In that example, operation of the speaker of the peripheral device 100 produces audio within a frequency outside of average human hearing (i.e., a range below 20 hertz or above 20,000 hertz) that represent the instruction set 122 while the input component of the target device is in the instruction set receiver mode.

Once the peripheral device 100 has transferred the instruction set 122 using the output component, the target device may install and/or begin to use the new copy of the instruction set 122. In some examples, that target device may then be a source to transfer the instruction set 122 to other devices of the same device type. In this manner, a firmware upgrade, for example, may be propagated in a secure manner to other devices that would utilize the same firmware upgrade. In some examples, the instruction set transfer operations discussed herein may occur in response to identification to an infected portion of firmware to be recovered from trusted peripheral device of the same type, for example.

FIG. 2 depicts the example system 200 of a peripheral device may comprise a memory resource 220 operatively coupled to a processor resource 218. As used herein, a system may be a collection of devices and/or components to implement functionality described herein. Referring to FIG. 2, the memory resource 220 may contain a set of instructions that are executable by the processor resource 218. Indeed, the memory resource 220 may be said to store program instructions that when executed by a processor resource cause the processor resource to implement functionality of the system 200 of FIG. 2. The set of instructions stored on the memory resource 220 may be represented as a comparison module 211, a component selection module 212, and a transmission module 213. The comparison module 211, the component selection module 212, and the transmission module 213 represent program instructions that when executed cause function of the comparison circuit 111, the component selection circuit 112, and the transmission circuit 113 of FIG. 1, respectively. The processor resource 218 may carry out a set of instructions to execute the modules 211, 212, 213, and/or any other appropriate operations among and/or associated with the modules of the system 200.

For example, the processor resource 218 may carry out a set of instructions to compare a first device type identifier of a first device to a second device type identifier of a second device, compare a first instruction set version identifier of the first device to a second instruction set version identifier of the second device in response to a determination that the first device type identifier matches the second device type identifier, cause the first device to select a first component to produce audio output or video output in response to a determination that the second instruction set version identifier of the second device mismatches the first instruction set version identifier of the first device, cause the second device to select a second component to receive the audio output or video output from the first component of the second device in response to a determination that the first instruction set version identifier of the first device represents a version newer than what is represented by the second instruction set version identifier of the second device (or older version in the case of a security roll back), and cause the first device to operate the first component to produce audio output or video output with an instruction set of the first device represented (e.g., encoded) in the audio output or the video output.

For another example, the processor resource 218 may carry out a set of instructions to identify a time of day at which the first component of the first device is authorized to operate in an instruction set producer mode and the second component of the second device is authorized to operate in an instruction set receiver mode based on a user preference stored on the respective devices and cause the first device to generate an audio signal with the instruction set encoded in a signal that represents the instruction set at a frequency in a range between 20 hertz and 20,000 hertz or a range below 20 hertz or above 20,000 hertz based on the identified time of day.

For yet another example, the processor resource 218 may carry out a set of instructions to perform, when the first device and the second device are in a power sleep state, a handshake operation to authorize communication between the first device and the second device using the first component of the first device, the second component of the second device, a third component of the second device to produce audio output or video output, and a fourth component of the first device to receive audio output or video output from the third component of the second device, wherein the handshake operation includes an operation to validate a key stored on a memory resource corresponding to the processor resource. In that example, the processor resource 218 may carry out a set of instructions to determine an end-of-transfer signal and cause the third component of the second device to pause operation within an output range corresponding to transfer of the instruction set until the end-of-transfer signal is received by the second component of the second device. More details regarding the use of multiple components and operations amongst multiple devices are discussed with respect to FIGS. 4-7.

Although the example modules of FIG. 2 and example circuits of FIG. 1 are illustrated as example implementations, other combinations or sub-combinations of modules or circuitry may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules or circuits illustrated and/or discussed as separate may be combined into a module or circuit that performs the functionalities discussed in relation to the two modules or two circuits. As another example, functionalities performed at one module as discussed in relation to these examples may be performed at a different module or different modules. Another example of a division of operations across circuits is depicted in FIG. 3.

As used herein, a processor resource is any appropriate circuitry capable of processing (e.g., computing) instructions, such as one or multiple processing elements capable of retrieving instructions from a memory resource and executing those instructions. For example, the processor resource 218 may be a central processing unit (CPU) that enables instruction set transfer by fetching, decoding, and executing modules 211, 212, and 213. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

Referring to FIG. 3, the example peripheral device 300 generally includes circuitry 310, a memory resource 320, an audio output component 302, a video output component 303, an audio input component 304, and a video input component 305. The memory resource 320 of FIG. 3 depicts storage of a device type identifier 321, an instruction set 322, and an instruction set version identifier 323 that are the same as device type identifier 121, the instruction set 122, and the instruction set version identifier 123 of FIG. 1, and their descriptions are not repeated in their entirety. Other data sets may be stored on the memory resource 320, such as a component list 324, a power state 325, and an instruction set mode 326.

The instruction set mode 326 may be any identifier, such as a number, letter, character, symbol, string, class, category, or label to represent whether the peripheral device and/or a component of the peripheral device is in an instruction set receiver mode, an instruction set producer mode, or not in a mode corresponding to operations for transferring an instruction set via audio or video signals. The power state 325 may be any identifier, such as a number, letter, character, symbol, string, class, category, or label to represent the operational state of the peripheral device, such as the sleep state of the device (e.g., S1-S4) or a level of activity (e.g., no interaction signals being received from the host). The component list 324 is any data structure to represent a number of audio or video components integrated or attached to the peripheral device. For example, the component list 324 may be an array of identifiers corresponding to the audio output component 302, the video output component 303, the audio input component 304, and the video input component 305. In an example, the component list 324 may be a look-up table with the list of useable components, the state of the component, and a characteristics range associated with a transfer of an instruction set between peripheral devices of the same device type via the corresponding component.

The circuitry 310 includes a comparison circuit 311, a component selection circuit 312, and a transmission circuit 313 that are the same as the comparison circuit 111, the component selection circuit 112, and transmission circuit 113 of FIG. 1, and their descriptions are not repeated in their entirety. The circuitry 310 also depicts a handshake circuit 314, an activity circuit 315, and a bystander circuit 316.

The handshake circuit 314 represents circuitry to perform handshake operations between devices using an audio component (e.g., 302 and/or 304) and/or a video component (e.g., 303 and/or 305). For example, the handshake circuit 314 may include a processor resource and executable instructions that cause the audio output component 302 to send a handshake request signal to another peripheral device and cause the audio input component 304 to receive a handshake acknowledgement signal from the peripheral device that was sent the handshake request signal. The handshake circuit 314 may cause an operation to perform authentication between devices. For example, the handshake circuit 314 may perform an operation to validate a key stored on a memory resource of a peripheral device. The handshake circuit 314 may manage handshake operation across multiple devices. For example, the handshake circuit 314 may perform a handshake operation to authorize communication between a first device and a second device using the audio or video components of both devices when the first device and the second device are in a power sleep state.

The activity circuit 315 represents circuitry to determine a state of operation of a peripheral device, such as peripheral device 300. For example, the activity circuit 315 may include a processor resource and executable instructions to retrieve a power state 325 from a memory resource of the peripheral device 300 and/or cause an input component (e.g., 304 or 305) to process a signal received from another peripheral device with the power state of the other peripheral device encoded in the signal. The power state may be a power sleep state (e.g., not fully powered) or a power working state (e.g., fully powered and active). Power sleep states may be tiered by the amount of power provided to components of a peripheral device, and, thereby, may limit functionality of a component differently at each tier. An activity level of a component and/or a peripheral device is a degree of operation of the component and/or peripheral. For example, if the panel of a computer monitor is emitting light then the panel may be in a power working state, where if the panel is not emitting changes in pixels then it may be in a low activity state or if the panel is not emitting light then the panel is in a no activity state (e.g., the lowest amount of activity). For another example, if a computer mouse is registering changes in a laser sensor to detect movement of the device, then the computer mouse is in a power working state, where if the laser is shut off then the computer mouse is in a power sleep state due to low activity (e.g., movement).

The activity circuit 315 may be used in conjunction with other circuits, such as determining the power state 325 of the peripheral device 314 before or during execution of the comparison circuit 311 and/or the transmission circuit 313. For example, the handshake circuit 314, in conjunction with the activity circuit 315, may cause the handshake operations to initiate while the peripheral device 300 is in an inactive or power sleep state as determined by the activity circuit 315, such as cause a handshake operation to perform authentication between the peripheral device and the target device using the video output component 303 of the peripheral device and a video input component of the target device in response to a determination that the peripheral device is in an inactive state where the peripheral is a display device with the panel powered down from inactivity.

The bystander circuit 316 represents circuitry to produce a signal to communicate to another peripheral device to pause or otherwise stop operation of an output component. In some example operation of the peripheral device to cause a transfer of the instruction set as described herein, a sound or video signal may be used to perform the transfer and other sound signals or video signals may affect analysis of the transfer signal. In such a circumstance, peripheral devices may be communicated with to terminate component operation within the operational characteristics range corresponding to the instructions set transfer. For example, to hinder interference with an instruction set transfer signal produced by the audio output component 302 or the video output component 303, the peripheral device 300 may send a message to peripheral devices to stop output component operation until the transfer of the instruction set 322 is complete. In an example, the bystander circuit 316 may include a processor resource and executable instructions that identify a bystander device (e.g., a peripheral device or a host device) in an active state corresponding to potential operation of an output component, identify an input component of the bystander device (e.g., such as by reviewing signals received by an input component or by transferring messages with the bystander device), and cause the output component of the peripheral device 300 to produce audio output or video output representing a request that the bystander device pause operation of audio output or video output while the target device is in an instruction set receiver mode. The bystander circuit 316 may then authorize the transmission circuit 313 to perform the instruction set transfer and once the transmission circuit 313 sends a signal to the bystander circuit 316 that the transfer is complete, the bystander circuit 316 can cause the devices to return to normal operation. For example, the bystander circuit 316 may cause the output component of the peripheral device 300 to produce audio output or video output representing completion of the transfer of the instruction set and to allow operation of audio output or video output of the bystander device. Indeed, the circuitry 310, such as the bystander circuit 316, may be used to execute operations to set an input component or output component into an instruction set mode 326, such as an instruction set receiver mode 326 for receiving an instruction set or an instruction set producer mode for generating output with an instruction set encoded therein. For example, a speaker may be enabled to produce audio signals at frequencies beyond 20,000 hertz when in the instruction set producer mode and a microphone may disregard signals received at frequencies beyond 20,000 hertz unless the microphone is in the instruction set receiver mode. Further examples of methods of operations between peripheral devices are discussed with respect to FIG. 4.

Figure 4:
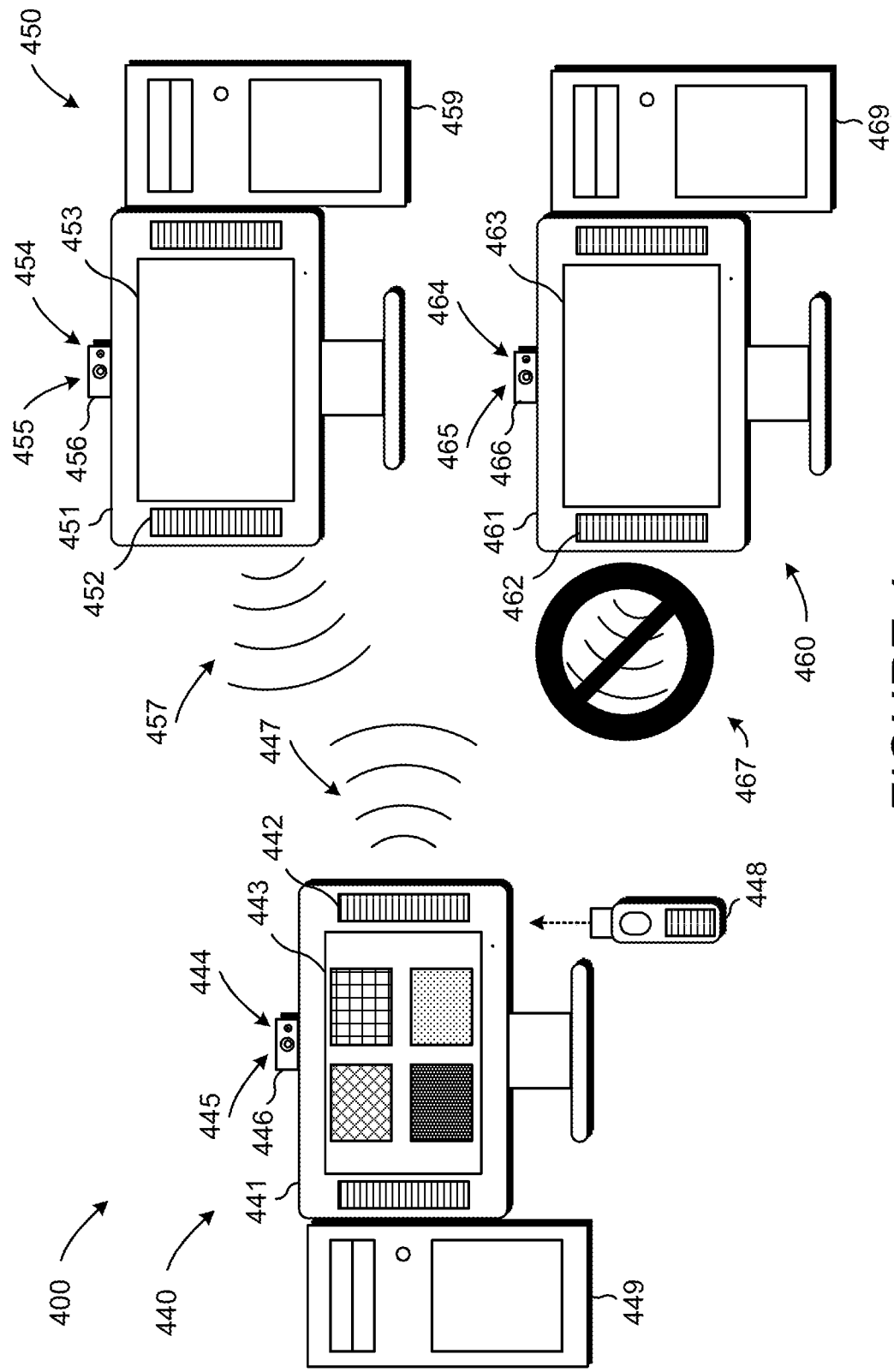
FIG. 4 depicts an example environment in which an example peripheral device provides an example instruction set to other example peripheral devices.

Referring to FIG. 4, the example computing environment 400 includes systems 440, 450, and 460 where each system includes a peripheral device (441, 451, and 461) that may be connected to a host device (449, 459, and 469). A peripheral device may be physically connected to a host device (e.g., have a direct electrical connection to a host device), wirelessly connected to a host device (e.g., wirelessly paired over a personal area network), or indirectly coupled to a host device to provide extended functionality for that host device. In some examples, a peripheral device may be coupled to multiple host devices. FIG. 4 depicts an example environment 400 in which an example peripheral device 441 provides an example instruction set to other example peripheral devices 451 and/or 461. The operations discussed with respect to FIG. 4 are performed without communication or other interaction with the host devices 449, 459, and 469.

The example peripheral devices 441, 451, and 461 of FIG. 4 are display devices. In other examples, other peripheral devices may perform such transfer operations and functionalities. The example peripheral devices 441, 451, and 461 include example audio components and example video components. The examples of audio components shown in FIG. 4 include speakers (442, 452, and 462) and microphones (444, 454, and 464) integrated into the corresponding display devices (e.g., within the housing of the display device). The examples of video components shown in FIG. 4 include panels (443, 453, and 463) and cameras (445, 455, and 465) integrated into the display devices. Some audio or video components may be stowable, such as locating the cameras and microphones on a deployable cabinet (446, 456, and 466) that extends from the housing of the display device upon a press of a button on a bezel of the display device. In some examples, the components may be deployed in an instruction set receiver mode or an instruction set producer mode.

Other example peripheral devices may have more or less audio components or video components. In one example, a model of the peripheral device may include an input component, but not a corresponding output component for performing a transfer of an instruction set. In such an example, an auxiliary device (such as auxiliary device 448 of FIG. 4) may be used which includes an output component and may also include circuitry (such as circuitry 110 of FIG. 1) to cause an instruction set to be transferred between peripheral devices in a hostless manner. In this example, the components used in the transfer request may be part of an external device coupled to the requesting peripheral device and/or the transferring peripheral device.

FIG. 4 depicts examples of transferring an instruction set using audio signals and video signals. In the example of FIG. 4, the peripheral device 441 includes circuitry to cause the panel 443 to generate flashing shades of color and cause the speaker 442 to generate sound that correspond to signals 447 with encoded data to produce an instruction set. Indeed, the instruction set may be transferred using video signals where the video signals are represented by colors to encode a representation of the instruction set and the instruction set may transferred using both audio output and video output.

In some examples, the signals 447 may be directed to a single peripheral device, such as a device authorized via authentication operations with a receiver peripheral device. For example, the peripheral device 451 may send authentication information encoded in signals 457 receivable by input components 445 and/or 444 of the peripheral device 441, and, in response, the peripheral device 441 may send an instruction set encoded in signals 447.

In some examples, the signals 447 may be directed to multiple peripheral devices. Referring to FIG. 4, the signals 447 may broadcast such that multiple peripheral devices 451 and 461 are within the proximity of communication using the speakers 442 and the panel 443 as well as within the proximity of reception using the microphones (454 and 464) and the cameras (455 and 465) on the peripheral devices 451 and 461. In an example, the peripheral device 441 may wait until the environment is dark (e.g., during evening hours) to flash white light in a manner corresponding to zeros and ones (i.e., a binary code representation of the instruction set) such that any peripherals in the same room or otherwise able to capture the change in lighting using an optical sensor are able to receive the binary code representation. In this manner, an entire room of peripheral devices may simultaneously receive signals corresponding to an instruction set, such as code corresponding to the latest firmware update. In another example, the speakers may transfer data using frequencies beyond the auditory perception abilities of human users, such that any peripheral device in the same room with microphones and circuitry to analyze signals at frequencies beyond the human auditory perception abilities may receive the instruction set broadcast while continuing to operate the speakers at frequencies within the range of human audio perception abilities concurrently with the instruction set transfer.

FIG. 4 depicts that the output components of peripheral device 461 have been silenced or otherwise made inactive to refrain from interfering with signals 447. In this example, the peripheral device 461 may still be able to receive the signals 447 via input components (e.g., 464 and 465) while the output components (e.g., 462 and 463) are in an instruction set receiver mode that stops the output components from producing audio signals and/or video signals.

Figure 5:
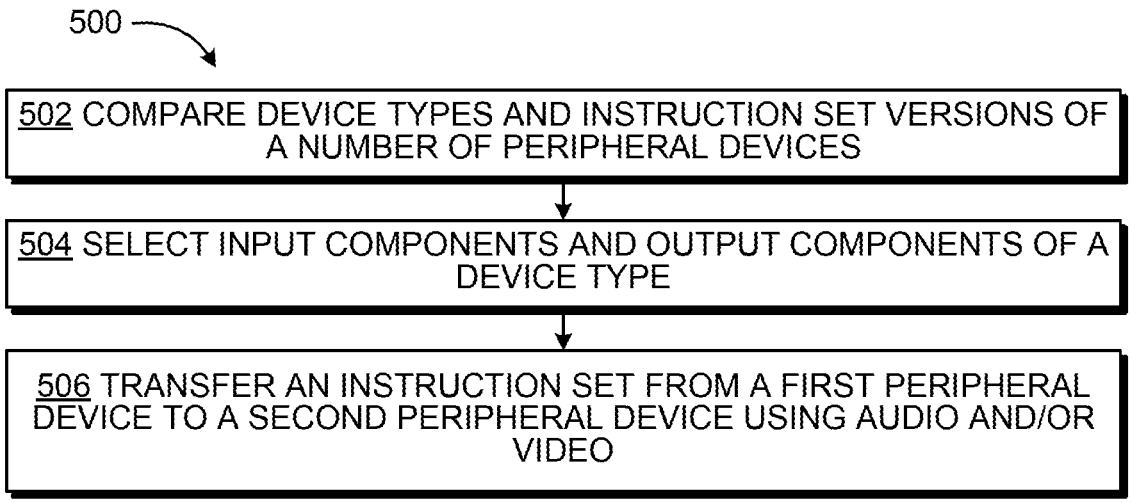
FIGS. 5-7 are flow diagrams depicting example methods of transfer of an example instruction set.
Figure 6:
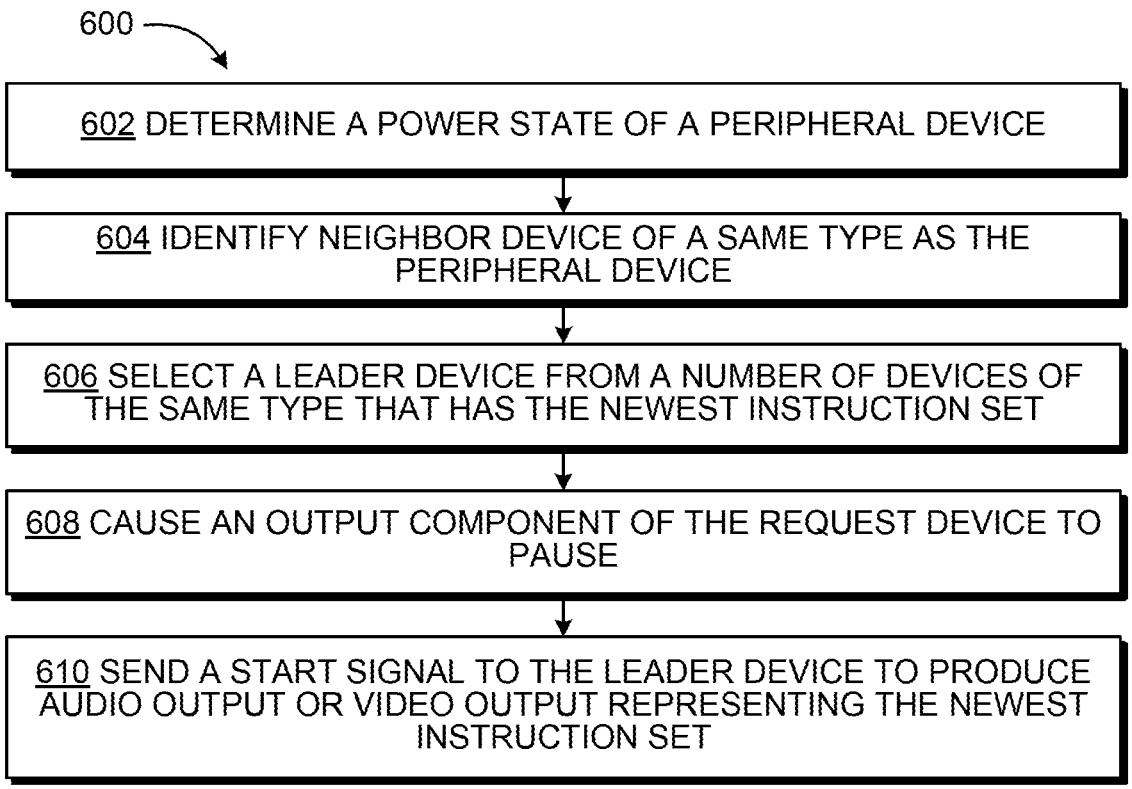
Figure 7:
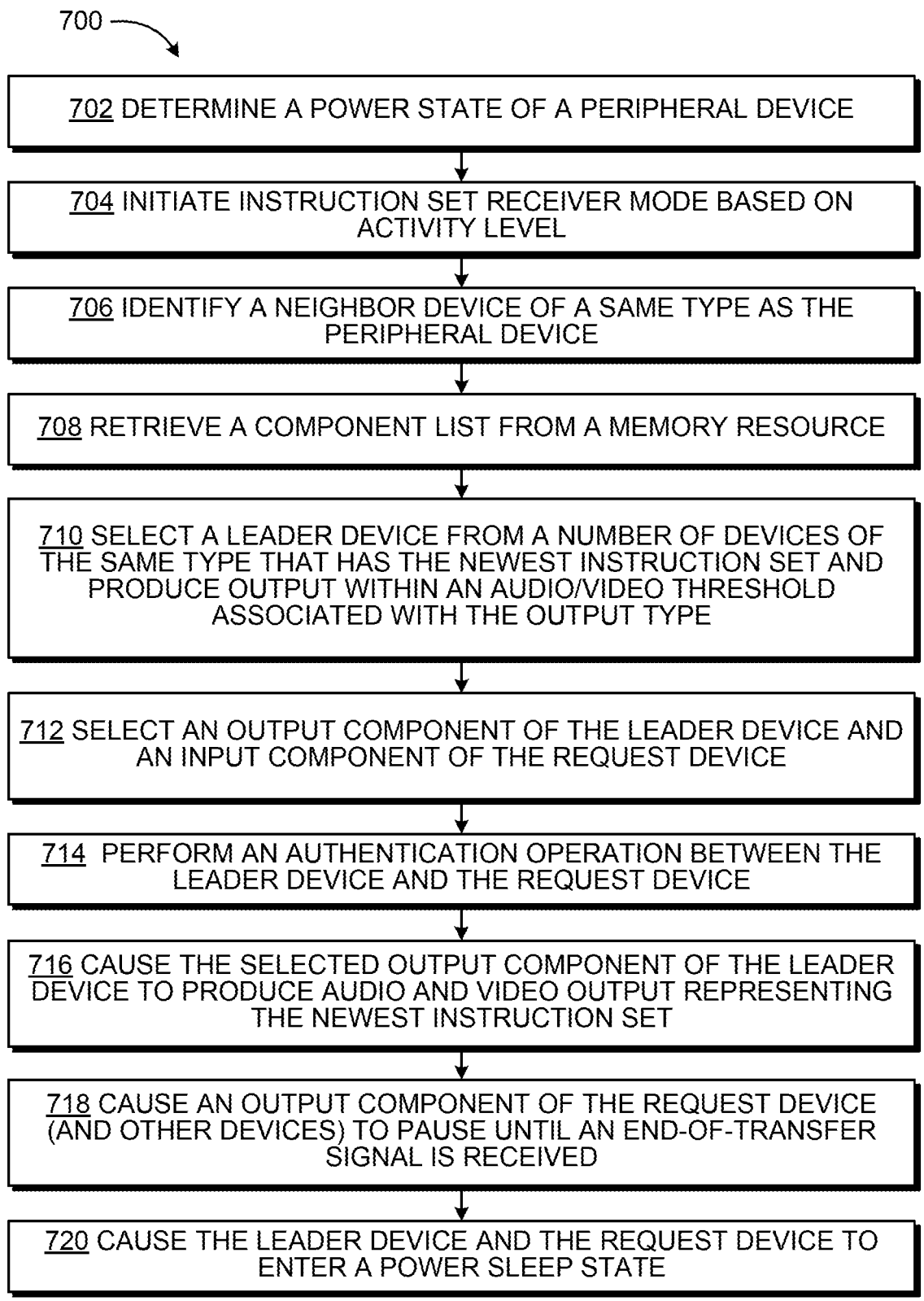

FIGS. 5-7 are flow diagrams depicting example methods 500, 600 and 700 of transfer of an example instruction set. Referring to FIG. 5, the example method 500 of transfer of an instruction set generally comprises comparing device types and instruction set versions of a number of peripheral devices, selecting an input component and an output component of a device type, and transferring an instruction set between devices using audio and/or video. The operations corresponding to methods 500, 600, and 700 may be performed by circuitry of peripheral device, such as circuitry 110 of FIG. 1, and in connection with any other operations, such as operations discussed with respect to FIG. 4.

At block 502, a number of instruction set versions of a number of peripheral devices are compared, such as in response to a number of messages received from a number of devices that respond to a broadcasted request for an instruction set. The comparison operation may include identifying an instruction set version that is the most recently deployed of the number of responses from peripheral devices. An instruction set version is identified and the peripheral device with that identified instruction set version is determined to broadcast the instruction set to the other peripheral devices of the same type.

At block 504, an input component and an output component of a device type are selected. For example, because the transfer is to occur between devices of the same type, each of the devices may have the same components (and knowledge of the components of the other devices) and an appropriate manner of transfer (e.g., audio or video) is selected as well as the components to support that manner of transfer. For example, if audio is selected for the manner of transfer then speakers and a microphone are selected as input and output components to perform the transfer of the instruction set.

At block 506, an instruction set is transferred from a first peripheral device to a second peripheral device using audio and/or video as determined by the selected input and output components at block 504. For example, upon receiving an acknowledgment that the receiving devices are ready, the transferring peripheral device may send a start signal and begin transferring audio or video with the instruction set encoded in the output signals.

Referring to FIG. 6, the method 600 of transfer of an instruction set generally comprises determining a power state of a device, identifying a neighbor device is of the same device type as a request device, selecting a leader device from a number of devices of the same device type, sending a start signal to a leader device, and causing a request device to pause output operation. Such operations may be performed by circuitry, such as a processor resource of a peripheral device.

At block 602, a power state of a peripheral device is determined. For example, a processor resource of a peripheral device may retrieve an identifier corresponding to a sleep state or activity state of the peripheral device from a memory resource. Example sleep states may be hibernation or wake-on-connection states or states corresponding to operating system power states S1-S4. In the example of S1-S4 tiered sleep states, the S0 state is a power working state (i.e., not a power sleep state) and S1-S4 states denote that less power is provided to the electrical components of the peripheral device than the power provided to the electrical components of the peripheral device in an S0 state.

At block 604, a neighbor device of a same type as a request device (e.g., the device requesting for an instruction set transfer) is identified. As used herein, a neighbor device is a peripheral device able to be within range of communication with another peripheral device over audio or video. The check for a neighbor device type may occur when the processor resource at block 602 determines the peripheral device is in a power sleep state. For example, a processor resource of a request device, may identify a neighbor device of a same device type as a request device when the request device is in a power sleep state that provides power to the processor resource (yet not the entire system of electrical components of the peripheral device). By performing the operations of the methods 500, 600, and 700 discussed herein while peripheral device(s) are in a power sleep state, the peripheral devices may perform upgrades and related instruction set transfers without interaction from a user or interference from host operations.

At block 606, a leader device is selected from a number of peripheral devices of the same device type. As used herein, a leader device is a peripheral device to be used as a source of an instruction set for transfer. Similar to block 604, the leader device selection may be performed by a processor resource while the peripheral device is in a power sleep state. The leader device may be selected based on which of the number of devices has a newest version of the instruction set and a degree of ability to transfer the instruction set to the request device over audio output or video output. For example, if multiple devices have a newest version of an instruction set, the device most central to a room or closest to the devices with older versions of the instruction set may be selected to improve the reliability of transfer of the instruction set over audio output or video output without interference or interruption.

At block 608, a first component of a request device is caused to pause operation. For example, a processor resource may send a signal to the request device indicating to stop video output within an output range corresponding to transfer of the instruction set while a second component receives signals corresponding to transfer of the instruction set. The request device may pause operation in an output range associated with instruction set transfer, and, in some examples, continue to operate outside of that range. In some examples, the output component may be limited to operation within the characteristics range (corresponding with transfer of an instruction set over audio output or video output) when the peripheral device is in a power sleep state and not while the peripheral device is in a power working state.

At block 610, a start signal is caused to be sent to a leader device by a processor resource to initiate transfer of an instruction set. For example, the leader device may receive an acknowledgement to begin transfer as encoded in an audio beep sound, where the start signal is to cause the leader device to operate an output component to produce a representation of the instruction set using audio output or video output. The instruction set is then transferred via operation of output component and received by input components of any request devices within transfer range. In this manner, an instruction set may be transferred using method 600 without operating a host device coupled to a peripheral device, for example.

Referring to FIG. 7, FIG. 7 includes blocks similar to blocks of FIG. 6 and provides additional blocks and details. In particular, FIG. 7 depicts additional blocks and details generally regarding initiating instruction set receiver mode, retrieving a component list, selecting an output component and an input component, performing authentication, and returning the peripheral devices to a power sleep state. Blocks 702, 706, 710, 716, and 718 are the similar to blocks 602, 604, 606, 608, and 610 of FIG. 6 and, for brevity, their respective descriptions are not repeated in their entirety.

At block 704, instruction set receiver mode is initiated on a request device based on an activity level determined at block 702. For example, a peripheral device may switch into a mode to receive a firmware upgrade during off-peak operation hours (e.g., early morning hours) when the peripheral device is in a power sleep state or otherwise performing a relatively low amount of activity (e.g., inactive panel of a display device or human interaction, such as mouse movement or key press, has not occurred for more than 30 minutes, etc.). In some examples, entering instruction set receiver mode or instruction set producer mode may cause the peripheral device and/or component to change power sleep state or even change to a power working state in order to perform operations and control the components to cause a transfer for an instruction set.

Once the peripheral device is in an instruction set receiver mode, the peripheral device acts as a request device (i.e., a device to make a request for transfer of an instruction set) and begins to identify neighbor devices of the same type as the peripheral device, as depicted in block 706. In some examples, the instruction set transfer operations of methods 500, 600, and/or 700 may not be performed unless the request peripheral device and the leader peripheral device are in a power sleep state or otherwise identified as being below a defined activity level.

A component list is retrieved from a memory resource at block 708. The operations at block 708 may be performed as part of the operation at block 706 or in response to identifying a neighbor device of the same type. The peripheral device knows potential combinations of audio or video signal transfer between components because the devices to be interacted with are of the same type (e.g., same model). For this reason, the peripheral device may disregard, limit, or not perform an external query to identify a component of another device, and may instead use the capabilities of itself to determine how to communicate with another peripheral device of the same type.

At block 710, a leader device is selected from a number of devices of the same type, where the leader device has the newest instruction set and is capable of producing output within an audio/video threshold associated with the output type. An audio/video threshold is a characteristics range corresponding to capabilities of a particular component to produce audio and/or video signals. For example, a speaker may have a limited range of audio fidelity or an LED may have limited range of producing distinguishable light range based on the light sensor of the request device to receive the video signal. At block 712, an output component of the leader device is selected based on the same device type (e.g., selected by a processor resource of a peripheral device from a component list stored on a memory resource of the peripheral device).

At block 714, an authentication operation is performed between the leader device and a request device. Though the peripheral devices may inherently communicate securely because of the identification of the same device type, an authentication operation may be performed to ensure the peripheral device is not being spoofed by a nefarious device acting as a peripheral device of the same type. The output component selected at block 712 may be used at block 714 to perform the authentication operation.

At block 716, the leader device is caused to produce audio output or video output corresponding to an instruction set to be transferred via the output component selected at block 712. For example, a processor resource of the leader device may cause the selected output component to produce audio output or video output in response to receipt of the start signal received by the leader device. At block 718, the output component of the request device (and other devices) may pause operation (e.g., pause production of output by the output component) until an end-of-transfer signal is received from the leader device. The end-of-transfer signal may be a bookend companion signal to the start signal to signify the end of the transfer of the instruction set. In response to the receipt of the end-of-transfer signal, the request device (as well as the leader device) may exit instruction set receiver mode (or instruction set producer mode as the case may be) enter into the power sleep state in which the device was in prior to the instruction set transfer operations of the method 700, if not already in that power sleep state. The end-of-transfer signal may be used to signal to other groups of peripheral devices to coordinate their own transfer of an instruction set specific to the other group without interference of the first group of peripheral devices. In this manner, a large room of a number of different types of peripheral devices may coordinate and propagate instruction sets to maintain the devices with up-to-date firmware, for example.

Although the flow diagrams of FIGS. 5-7 illustrate specific orders of execution, the execution order may differ from that which is illustrated. For example, the execution order of the blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. The article "a" as used herein does not limit the element to a single element and may represent multiples of that element. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A peripheral device comprising:
    a memory resource having stored thereon:
        a device type identifier;
        an instruction set; and
        an instruction set version identifier;
    an output component to produce audio output or video output; and
    circuitry to:
        identify a target device that matches the device type identifier of the peripheral device within a proximity threshold associated with the output component;
        cause, in response to a determination that an instruction set version identifier of the target device mismatches the instruction set version identifier of the peripheral device:
            selection of an input component of the target device corresponding to the device type identifier and the output component of the peripheral device;
            transmission of a request to place the input component of the target device into an instruction set receiver mode; and
            operation of the output component of the peripheral device to produce audio output or video output that represents the instruction set.

2. The peripheral device of claim 1, wherein:
    the peripheral device is a display device;
    the output component is a panel of the display device;
    the input component of the target device is an optical sensor; and
    the operation of the panel, while the input component of the target device is in the instruction set receiver mode, produces video output from the panel representing the instruction set.

3. The peripheral device of claim 1, wherein:
    the peripheral device is a human interface device (HID);
    the output component of the peripheral device is a speaker of the HID;
    the input component of the target device is a microphone; and
    the operation of the speaker, while the input component of the target device is in the instructions set receiver mode, produces audio signals within a frequency range below 20 hertz or above 20,000 hertz.

4. The peripheral device of claim 1, wherein the circuitry is to:
    cause, in response to a determination that the peripheral device is in an inactive state, a handshake operation to perform authentication between the peripheral device and the target device using the output component of the peripheral device and the input component of the target device.

5. The peripheral device of claim 1, wherein the target device is identified using the output component of the peripheral device and the input component of the target device, and the circuitry is further to:
    identify a bystander device in an active state corresponding to potential operation of the output component of the peripheral device and an input component of the bystander device;
    cause the output component of the peripheral device to produce audio output or video output representing a request that the bystander device pause operation of audio output or video output while the target device is in an instruction set receiver mode; and
    cause the output component of the peripheral device to produce audio output or video output representing completion of the transfer of the instruction set and to allow operation of the bystander device to allow operation of audio output or video output.

6. A non-transitory computer-readable storage medium (NTCRSM) comprising a set of instructions executable by a processor resource to:
    compare a first device type identifier of a first device to a second device type identifier of a second device;
    in response to a determination that the first device type identifier matches the second device type identifier, compare a first instruction set version identifier of the first device to a second instruction set version identifier of the second device;
    in response to a determination that the first instruction set version identifier of the first device represents a version newer than what is represented by the second instruction set version identifier of the second device, cause the first device to select a first component to produce audio output or video output and cause the second device to select a second component to receive the audio output or video output from the first component of the second device; and
    cause the first device to operate the first component to produce audio output or video output with an instruction set of the first device represented in the audio output or the video output.

7. The NTCRSM of claim 6, wherein the set of instructions is executable by the processor resource to:
    cause the first device to generate an audio signal with the instruction set encoded in a signal that represents the instruction set at a frequency below 20 hertz or above 20,000 hertz.

8. The NTCRSM of claim 6, wherein the set of instructions is executable by the processor resource to:
    identify a time of day at which the first component of the first device is authorized to operate in an instruction set producer mode and the second component of the second device is authorized to operate in an instruction set receiver mode based on a user preference stored on the respective devices.

9. The NTCRSM of claim 6, wherein the set of instructions is executable by the processor resource to:
    perform, when the first device and the second device are in a power sleep state, a handshake operation to authorize communication between the first device and the second device using the first component of the first device, the second component of the second device, a third component of the second device to produce audio output or video output, and a fourth component of the first device to receive audio output or video output from the third component of the second device, wherein the handshake operation includes an operation to validate a key stored on a memory resource corresponding to the processor resource.

10. The NTCRSM of claim 9, wherein the set of instructions is executable by the processor resource to:

determine an end-of-transfer signal; and cause the third component of the second device to pause operation within an output range corresponding to transfer of the instruction set until the end-of-transfer signal is received by the second component of the second device.

11. A method of transfer of an instruction set, the method comprising:

identifying, via a processor resource of a request device in a power sleep state, a neighbor device of a same device type as a request device;

selecting, via the processor resource while in the power sleep state, a leader device from a number of devices of the same device type based on which of the number of devices has a newest version of the instruction set and a degree of ability to transfer the instruction set to the request device over audio output or video output;

sending, via the processor resource, a start signal to the leader device over a first component, the first component to produce audio output or video output and the start signal to cause the leader device to operate an output component to produce a representation of the instruction set using audio output or video output; and causing, via the processor resource, the first component to pause operation within an output range corresponding to transfer of the instruction set while a second component receives signals corresponding to transfer of the instruction set.

12. The method of claim 11, comprising:

selecting, via the processor resource, an output component of the leader device based on the same device type;

causing the leader device to produce audio output or video output via the selected output device in response to receipt of the start signal received by the leader device; and causing the leader device and the request device to enter the power sleep state.

13. The method of claim 11, wherein:

the instruction set is transferred using video signals, the video signals using colors to encode a representation of the instruction set.

14. The method of claim 11, wherein:

the instruction set is transferred using both audio output and video output.

15. The method of claim 11, wherein:

the first component and the second component are part of an external device coupled to the request device.

\* \* \* \* \*